United States Patent
Henshaw

(10) Patent No.: US 7,958,620 B2
(45) Date of Patent: Jun. 14, 2011

(54) METHOD OF PRODUCING A ROTARY ENCODER

(75) Inventor: James Reynolds Henshaw, Stroud (GB)

(73) Assignee: Renishaw PLC, Wotton-under-Edge (GB)

( * ) Notice: Subject to any disclaimer, the term of this patent is extended or adjusted under 35 U.S.C. 154(b) by 783 days.

(21) Appl. No.: 11/886,064

(22) PCT Filed: Apr. 25, 2006

(86) PCT No.: PCT/GB2006/001500
§ 371 (c)(1),
(2), (4) Date: Sep. 11, 2007

(87) PCT Pub. No.: WO2006/114602
PCT Pub. Date: Nov. 2, 2006

(65) Prior Publication Data
US 2008/0189934 A1    Aug. 14, 2008

(30) Foreign Application Priority Data
Apr. 26, 2005    (GB) .................................. 0508325.8

(51) Int. Cl.
*H02K 15/00*    (2006.01)
*H02K 15/14*    (2006.01)
*H02K 15/16*    (2006.01)

(52) U.S. Cl. ............. 29/596; 29/428; 29/593; 29/602.1; 33/292; 33/534; 33/706; 33/707; 250/231.12; 250/231.16; 250/230; 250/232; 250/233; 318/602; 318/638; 318/651

(58) Field of Classification Search .................... 29/428, 29/593, 595, 596, 602.1; 33/1 PT, 1 N, 292, 33/534, 706, 707; 250/231.13, 231.14, 231.16, 250/230, 232, 233; 318/602, 638, 651
See application file for complete search history.

(56) References Cited

U.S. PATENT DOCUMENTS
4,554,044 A * 11/1985 Gaspar et al. .................. 156/510
6,304,825 B1   10/2001 Nowak et al.
2006/0065414 A1   3/2006 Brandl et al.

FOREIGN PATENT DOCUMENTS
| DE | 100 19 499 A1 | 10/2001 |
| EP | 0 320 589 B2 | 6/1989 |
| EP | 1 643 216 A1 | 4/2006 |
| JP | A-08-061979 | 3/1996 |
| WO | WO 03/041905 A1 | 5/2003 |
| WO | WO 2006/114619 A1 | 11/2006 |

\* cited by examiner

Primary Examiner — Paul D Kim
(74) Attorney, Agent, or Firm — Oliff & Berridge, PLC

(57) ABSTRACT

A method of determining the eccentricity of an encoder scale member of a rotary encoder includes taking an encoder scale blank having a geometric center and mounting the encoder scale blank centered about a second center. A scale can then be produced on the encoder scale blank thereby forming an encoder scale member. The scale of the encoder scale member is centered about the second center. Any eccentricity between the geometric center and the second center is measured by, for example, measuring any change in the apparent radius of the encoder scale member. The encoder scale member may then be mounted in a working location wherein it is rotated about a third axis. The eccentricity when mounted in the working location may be matched to that measured during manufacture thereof and/or the eccentricity errors arising from both manufacture and mounting of the encoder scale member may be determined.

16 Claims, 7 Drawing Sheets

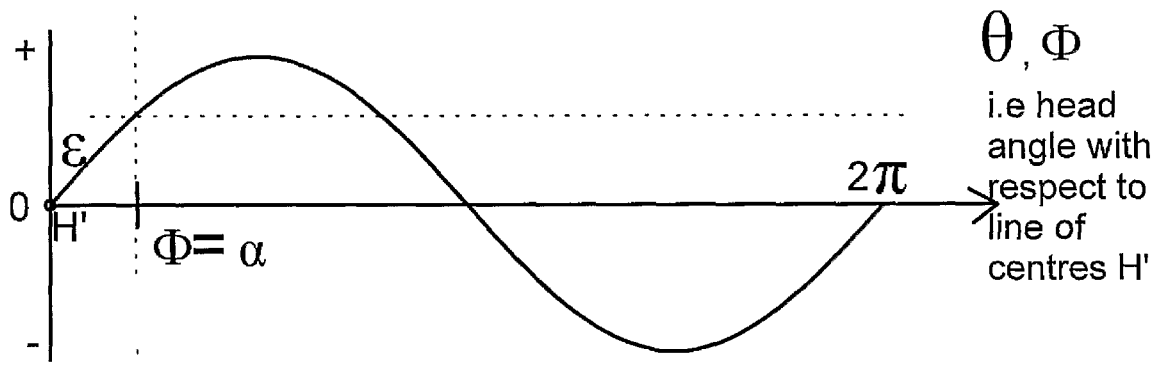
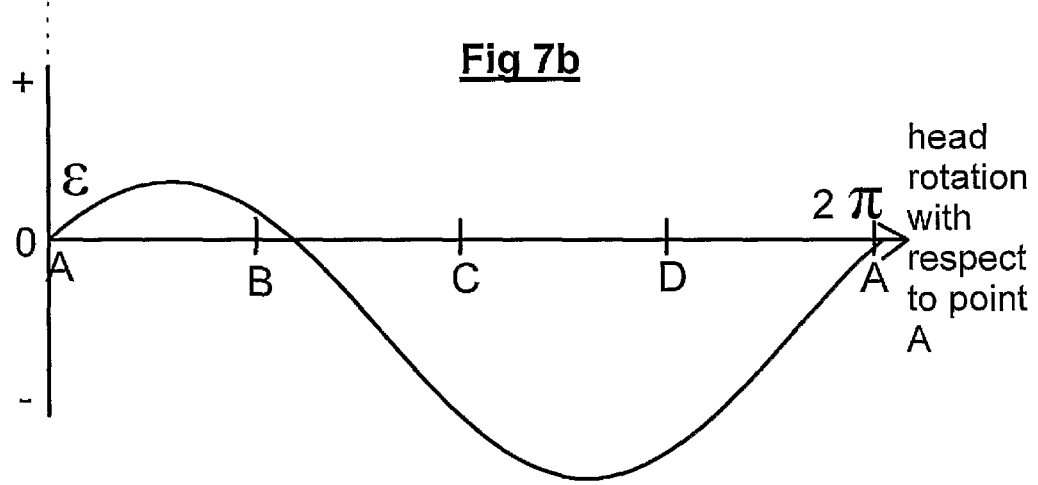

METHOD OF PRODUCING A ROTARY ENCODER

This invention relates to the correction of errors caused by an eccentrically mounted rotary type encoder mounted for rotation about an axis.

Whilst such errors are generally small, they are significant for highly accurate encoders. Typically when a rotary encoder scale member is mounted to a shaft or the like it is necessary firstly to try to get it mounted as perfectly as possible about the same axis as the intended rotational axis. Any eccentricity of the encoder, known also as run-out, will detract from the accuracy of the rotary encoder and cause errors in angular measurement where an encoder scale member and single readhead are employed. Errors caused by eccentricity are manifested as a error of sinusoidal magnitude having a period equal to one rotation of the encoder.

Conventionally the errors must be minimised by mounting the encoder on the shaft and measuring the eccentricity, then adjusting the encoder mounting until the encoder has as little eccentricity as possible. The encoder is made with its angular divisions as accurately as possible about the geometric centre of the encoder so that alignment of the encoder gives alignment of the angular divisions. However, absolutely perfect alignment is not possible so eccentricity errors may occur during manufacturing. In such instances the centre of angular divisions may not coincide with the geometric centre of rotation of the encoder. So, even if the encoder is mounted accurately, sinusoidal errors caused by manufacturing error may still be present.

Methods for correction of errors caused by run-out are known. Japanese Patent Application No. 80-61979 proposes using three encoder readers spaced equally around an encoder and producing a signal equal to the mean timing of the three signals from the three readers plus a fixed delay period. This is a relatively expensive solution and may not be suitable where space is constrained. It is also difficult to align the three readers around the encoder.

U.S. Pat. No. 6,304,825 discloses apparatus which requires error correction by means of a look-up table. The table is generated from sinusoidal errors measured after an encoder unit is mounted to its shaft. The phase and amplitude of the cyclic encoder error are known with respect to a datum position on the encoder. These values are obtained by comparing the outputs of the encoder under investigation with a master reference encoder. A fixed delay period is used to which is added or subtracted the error known from the look-up table.

According to a first aspect of the present invention, a method of producing a rotary encoder comprises the steps of; (i) taking an encoder scale blank having a geometric centre, (ii) mounting the encoder scale blank centred about a second centre, (iii) producing a scale on the encoder scale blank thereby forming an encoder scale member, the scale of the encoder scale member being centred about the second centre; characterised in that the method comprises the step of (iv) measuring any eccentricity between the geometric centre and the second centre.

The present invention thus provides a method for producing an encoder scale member. The method involves taking an encoder scale blank having a geometric centre. The encoder scale blank may, for example, comprise a metallic ring. The encoder scale blank is rotatably mounted to appropriate scale forming apparatus about a second centre. A series of scale markings (e.g. a series of light reflecting and light non-reflecting lines) are formed on the encoder scale blank as it is rotated about the second centre. In this manner, an encoder scale member is formed from the encoder scale blank that has a scale which is centred about the second centre.

After forming the encoder scale member, the eccentricity between the geometric centre and the second centre is measured. Preferably, the step (iv) of measuring the eccentricity between the geometric centre and the second centre is performed with the encoder scale member mounted in the scale forming apparatus. For example, such a measurement may be made immediately after, or before, the scale is formed. In other words, step (iii) may precede or follow step (iv) but it is preferred that the mounting of the encoder scale member is not adjusted between these steps.

As described in more detail below, knowing the eccentricity between the geometric centre and the second centre is advantageous when subsequently installing the encoder scale member to form an encoder device. For example, it allows any eccentricity of the encoder scale member that was present during manufacture to be imitated when the encoder scale member is mounted in a working location. It is also possible to combine the eccentricity errors measured during manufacture of the encoder scale member with eccentricity errors measured when the encoder scale member is fitted in an operative position. This permits corrected angular measurements to be provided in which any eccentricity errors present in both manufacture and installation of the encoder scale member can be taken into account.

An advantage of the present invention is that no master reference need be used during installation of the encoder scale member because calculations of eccentricity error can be made after the encoder is installed. These errors are deduced from known manufacturing eccentricity errors and may be combined with eccentricity measurements taken at installation or re-setting of the encoder.

It should be noted that the term "eccentricity" as used herein means the distance between two centres of rotation or a change in apparent radius resulting from such a distance. The term "encoder scale member" as used herein means the scale member of an encoder device used for angular or incremental measurement of rotation. As outlined in more detail below, the encoder scale member may comprise an arcuate member (e.g. a member that is not fully circular) or a completely circular member (e.g. a ring) for continuous rotational angular measurement.

Advantageously, step (iv) comprises measuring any change in apparent radius of an element of the encoder scale member when said encoder scale member is rotated to a plurality of different angular orientations. A number of techniques for measuring changes in apparent radius are known; e.g. using dial test indicators and the like. Furthermore, a number of suitable methods are also described in our co-pending international (PCT) application (Ref: 651WO) which claims priority from British patent application GB 0508335.7.

Preferably, said plurality of different angular orientations comprise three or more different angular orientations. More preferably, the plurality of different angular orientations comprises at least 4, at least 5, at least 6, at least 8, or at least 10 different angular orientations.

Conveniently, the encoder scale member comprises at least one marking to identify said plurality of orientations. For example, three or more markings may be provided around the encoder scale member. One or more of these markings may be uniquely identifiable, thereby allowing each mark to be uniquely identified. For example, a master marking may comprise a line whilst further markings may comprise a dot. Such markings may be an integral part of the scale formed on the encoder scale member during step (iii) or may be provided separately.

Advantageously, the method comprises the step of (v) installing the encoder scale member in a working location centred about a third centre. For example, the encoder scale member may be mounted to a rotatable member. The rotatable member may comprise a bearing which is rotatable about the third centre of rotation. The encoder scale member may be bolted or attached in any suitable manner to the rotatable member. For example, a tapered mount may be provided.

Preferably, the method comprises the step of (vi) measuring the eccentricity between the geometric centre and the third centre. In other words, the eccentricity of the installed encoder scale member is measured. Advantageously, such a measurement of eccentricity comprises measuring the change in apparent radius of an element of the encoder scale member at a plurality of angular orientations. As noted above, a number of techniques may be used to perform such measurements. The change in apparent radius of an element of the encoder scale member is preferably measured at three or more angular orientations. More preferably, such measurements are made using at least 4, at least 5, at least 6, at least 8, or at least 10 different angular orientations.

Advantageously, step (iv) comprises measuring the change in apparent radius at the same angular orientations that are measured in step (vi). The provision of one or more markings around the circumference of the encoder scale member allows this to be readily achieved.

Conveniently, the method also comprises the step of (vii) adjusting the working location of the encoder scale member. In particular, step (vii) may advantageously comprise adjusting the working location of the encoder scale member and repeating step (vi) until the eccentricity between the geometric centre and the second centre as measured in step (vi) substantially matches the eccentricity between the geometric centre and the third centre as measured in step (iv). In other words, the step of installing the rotary encoder includes attempting to get the eccentricity of the encoder the same as or similar to the eccentricity of the encoder when produced.

Advantageously, the method also comprises the step of (viii) calculating the amplitude and phase of the sinusoidal eccentricity error caused by the difference in position of the second and third centres.

As outlined in more detail below with reference to FIG. 4, if the plurality of positions comprises four equispaced positions A,B,C, and D about the encoder scale member, the deviation from the points A,B,C and D as measured and recorded at production of the encoder is a,b,c and d, and as measured at installation of the encoder is a',b',c' and d'. Taking r as the nominal radius of the encoder and θ as the angle moved through, then the amplitude of the sinusoidal error ε is equal to:

$$\varepsilon = \frac{1}{2r}\sqrt{(c'-a'+a-c)^2 + (d'-b'+b-d)^2}\sin\theta$$

The phase of the sinusoidal error may then be determined by the angle α, given by:

$$\tan\alpha = \frac{y}{x} = \frac{d'-b'+b-d}{c'-a'+a-c}$$

where x and y are dimensions illustrated in FIG. 4.

Thus the amplitude and phase of the sinusoidal error can be determined from the four measurements at points A,B,C and D about the encoder which can then be used for example for automatic correction of measured angular position at any position about the encoder (e.g. by means of an algorithm). Although four measurement points are described, it should be remembered that the technique can be applied using fewer, or additional, measurement points as required. Providing a larger number of measurements points allows higher harmonics of the error to be determined and eliminated. Furthermore, taking measurements at many points can reduce uncertainties introduced if the encoder scale member flexes during the measurement process thereby providing a better estimate of the centre of rotation.

A step may also be conveniently performed of (ix) generating an angular output signal that is corrected for eccentricity. The step of calculating the amplitude and phase of the error may be performed as an algorithm and error values deduced thereby may be stored in a look-up table or other record, or may be used to correct the angular reading.

Conveniently, step (iii) comprises using a laser to form scale markings on the encoder scale blank. For example, the scale markings may be formed using a technique of the type described in WO03/041905. As noted above, the encoder scale member may conveniently comprises at least one of a ring and an arcuate member.

According to a second aspect of the invention, a method of mounting an encoder scale member is characterised by the steps of; (a) taking an encoder scale member having a geometric centre, the encoder scale member also comprising a scale that is centred about a second centre, wherein the eccentricity between the geometric centre and the second centre is known, (b) mounting the encoder scale member in a working location centred about a third centre, and (c) measuring the eccentricity between the geometric centre and the third centre.

The second aspect of the invention thus provides a method that can be implemented when installing a pre-formed encoder scale member in which the eccentricity between the geometric centre and the second centre is known. Step (a) of the method may conveniently comprise taking an encoder scale member formed using a method according to the first aspect of the invention.

Advantageously, the method comprises the step of (d) adjusting the working location and repeating step (c) until the eccentricity between the geometric centre and the third centre substantially matches the known eccentricity between the geometric centre and the second centre. In other words, the eccentricity between the geometric centre and the third centre is not minimised as in previous techniques, it is instead altered so as to match the eccentricity that was present during manufacture of the encoder scale member from the encoder scale blank.

Conveniently, the method comprises the step (e) of calculating the amplitude and phase of the sinusoidal eccentricity error caused by the difference in position of the second and third centres. This permits eccentricity arising from both manufacturing and installation errors to be corrected.

According to a third aspect of the invention a method of correcting for eccentricity is characterised by comprising the steps of; (A) taking a first set of eccentricity values indicative of the eccentricity between the geometric centre of the encoder scale member and a second centre, the scale markings of the encoder scale member being centred about the second centre, (B) taking a second set of eccentricity values indicative of the eccentricity between the geometric centre of the encoder scale member and a third centre, the third centre being the centre of rotation of the encoder scale member at its working location, and (C) deriving an angular correction from the first set of eccentricity values and the second set of eccentricity values.

In this manner the first (i.e. as manufactured) and second (i.e. as installed) eccentricity error values can be used to correct the angular values output by the encoder. The removal of such errors will increase the accuracy and consistency of angular measurements obtainable from such encoder devices.

A computer program may be provided for implementing such a method. A computer program carrier (e.g. a compact disk, hard drive etc) containing the computer program may also be provided. Advantageously, a computer suitably programmed to execute the method may be provided.

There is thus described herein a method for determining errors caused by eccentricity of a rotary or angle encoder scale member. Such a method may comprise, in any suitable order, any one or more of the steps of:

(1) producing a rotary or angular encoder scale blank having a geometric centre;
(2) mounting the blank centred about a second centre and producing a scale on the blank centred about the second centre to form an encoder scale member;
(3) measuring and recording at a plurality of angular positions, values of the change in apparent radius of an element of the encoder scale member caused by eccentricity between the geometric centre and the second centre;
(4) installing the encoder scale member in a working location centred about a third centre;
(5) further measuring at the plurality of angular positions, the change in apparent radius of the element of the encoder scale member caused by eccentricity between the geometric centre and the third centre;
(6) adjusting the position of the encoder to attain values for the change in radius at the plurality of positions which are similar to those values recorded in step (3); and/or
(7) calculating the amplitude and phase of the sinusoidal error in the scale caused by the difference in position of the second and third centres, by means of using the measured changes in radii of steps (3) and (5).

The invention extends to a computer program which when run on a computer carries out the method defined in step (7) above. The program may include step (5) and/or step (6) above.

Also described herein is a method for determining errors caused by eccentricity of a rotary encoder comprising the steps of: (1) installing a rotary encoder to a rotary member; (2) measuring the eccentricity of the encoder when fitted to the rotatable member at a number of positions; and (3) calculating the amplitude and phase of sinusoidal error caused by the measured eccentricity. A method for determining eccentricity errors based on a plurality of eccentricity measurements is thus described. This method is particularly useful when the rotary encoder is made with as little eccentricity as possible but, perhaps unavoidably, is mounted having eccentricity. The invention extends to a computer program, which when run on a computer, carries out the method step (3). The program may also perform step (2).

The invention will now be described, by way of example only, with reference to the accompanying drawings in which:

FIGS. 7a, 7b, 8a and 8b show examples of the error caused by eccentricity.

Figure 1:
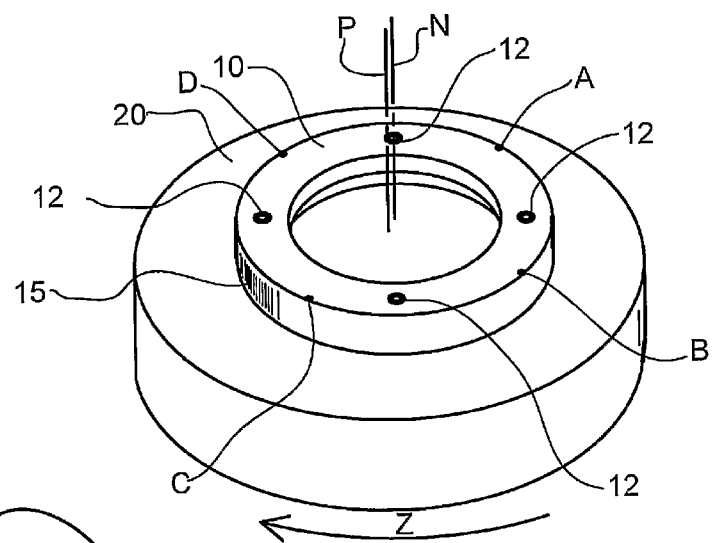
FIG. 1 shows a representation of the production of a rotary encoder.
Figure 2:
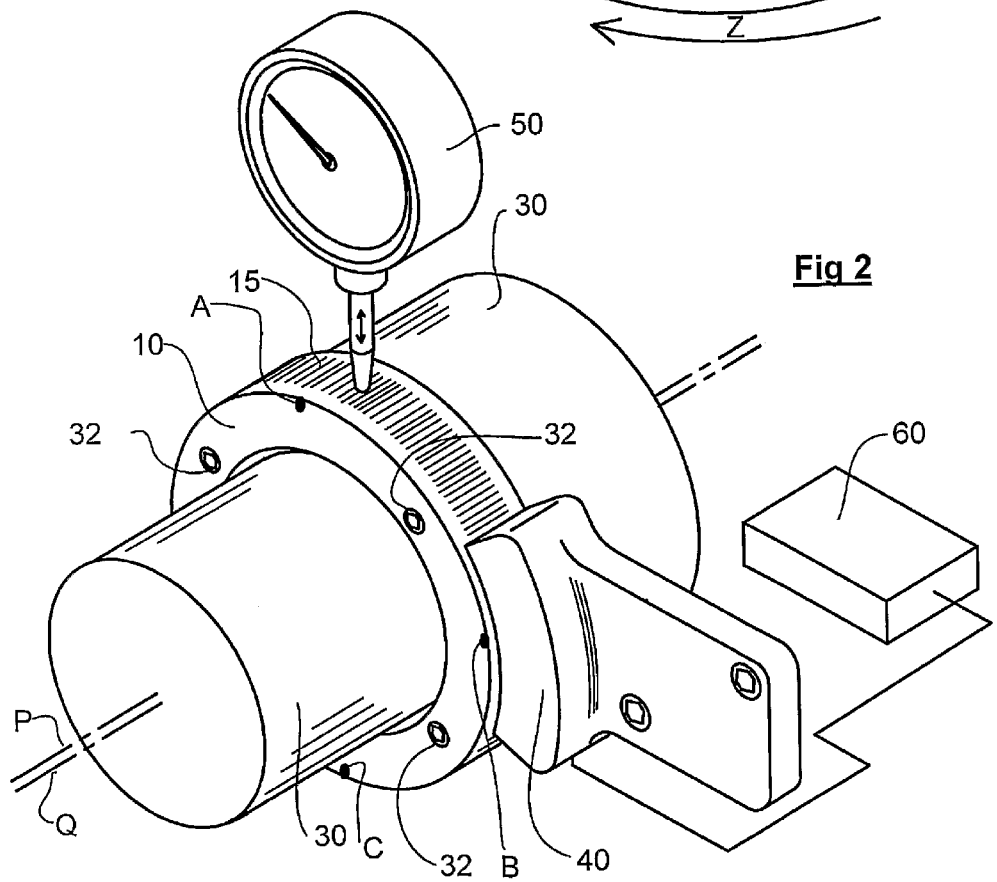
FIG. 2 shows a representation of an installed rotary encoder.

FIG. 1 shows a rotary encoder scale member 10 mounted to a rotary table 20 which rotates in the direction of arrow Z about axis P. Marks 15 are formed on the encoder scale member 10 about axis P to divide the encoder into predetermined angular divisions. The encoder scale member will have a nominal geometric axis N which will be very close to axis P, but the two axes may not be exactly in alignment. This misalignment (eccentricity or run-out) can be measured before the encoder scale member 10 is removed from the table 20 using a dial test indicator (DTI); a DTI 50 is shown in FIG. 2. Preferably, the DTI is used to take four run-out measurements with the encoder scale member rotated to points A,B,C and D. These run-out values are recorded as calibration data.

FIG. 2 shows the encoder scale member 10 fitted to a shaft 30. The encoder scale member 10 and shaft 30 have complementary taper mountings (hidden) which allow some adjustment of the encoder scale member 10 when mounted to the shaft 30 by means of tightening screws 32 in the screw holes 12. The DTI 50 has a fixed position and can be used to determine the run-out when the encoder scale member is rotated to the positions A,B,C, and D (hidden). The adjustment of the screws 32 can result in the encoder being mounted reasonably well about the axis of shaft rotation Q but some run-out may remain. The encoder scale member will thus be rotating about axis Q which is not the same as axis P. The encoder reader 40 is used to read angular measurements of the shaft 30 in use.

It will be apparent that the different production and installation centres P and Q will cause errors when reading apparent angular rotation of the encoder scale member 10 in use. It may happen that these eccentricities tend to cancel each other, or may be cumulative producing even greater error than either the eccentricity at production or the eccentricity at installation alone.

These eccentricities can be used to compensate for angular error as outlined in the following description. Firstly, however, it should be noted the magnitude of errors in comparison to the radius of the encoder scale member 10 has been greatly exaggerated to explain the effect. In reality the eccentricity is typically a few µm. Also the form (out-of-round) errors of an encoder are greatly exaggerated.

Figure 3:
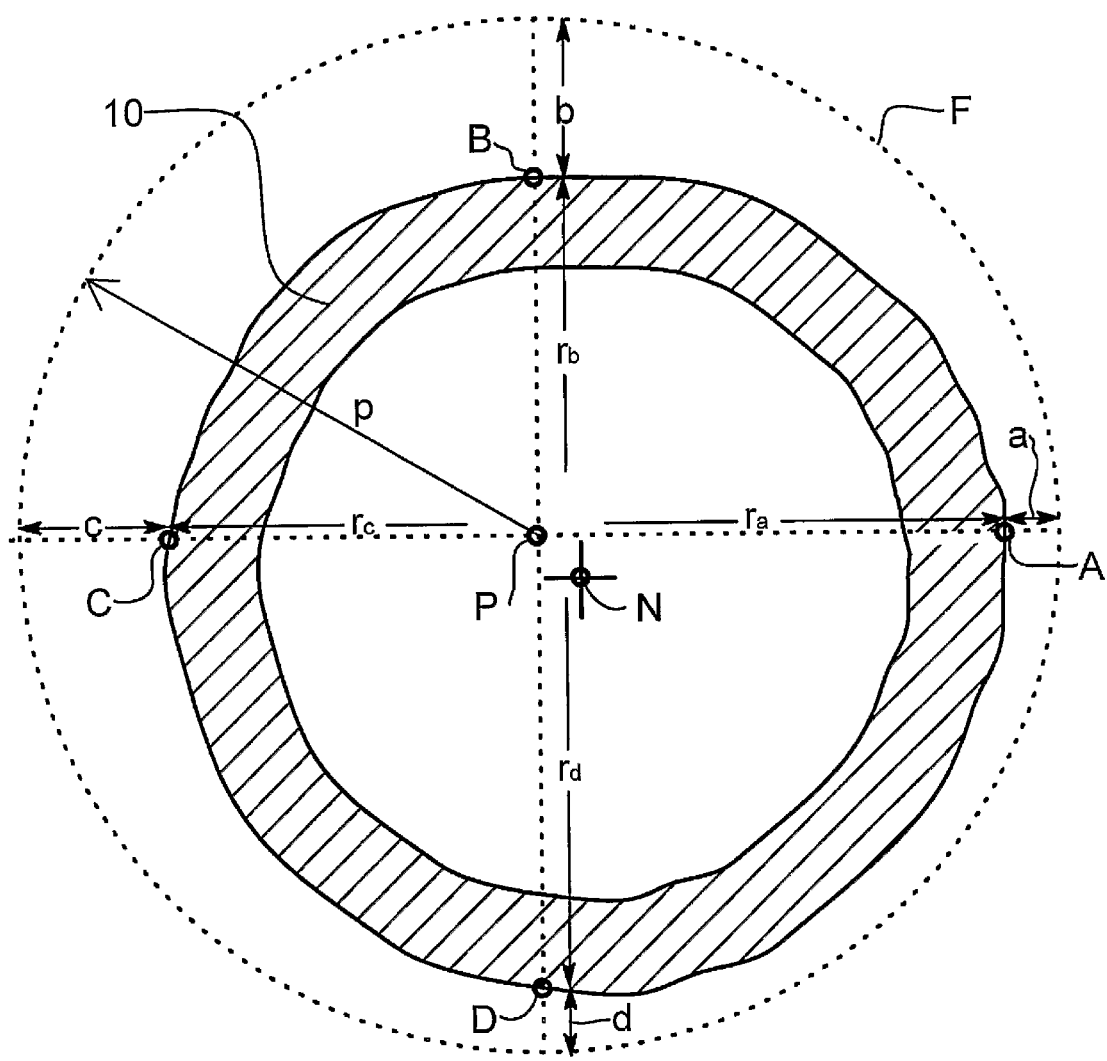
FIGS. 3-6 show the geometric relationships between the produced and installed rotary encoder.

FIG. 3 shows encoder scale member 10 mounted about axis P as it would be when graduations 15 are produced. As mentioned above the encoder scale member 10 (which may not be exactly circular) has a nominal geometric centre N, however when graduated it was rotated about axis P. This non-perfect mounting will be manifested as eccentricity and can be measured before the encoder scale member 10 is removed from its production table 20. In this instance four substantially equi-spaced positions A,B,C and D are used as measurement points, yielding four dimensions of run-out when compared with a circle F of arbitrary radius p centred at P. The positions A,B,C and D each have respective radii $r_a, r_b, r_c$ and $r_d$ from point P. Radius p is chosen so that a,b,c and d are all positive and small (including zero) for simplicity in this example.

Figure 4:
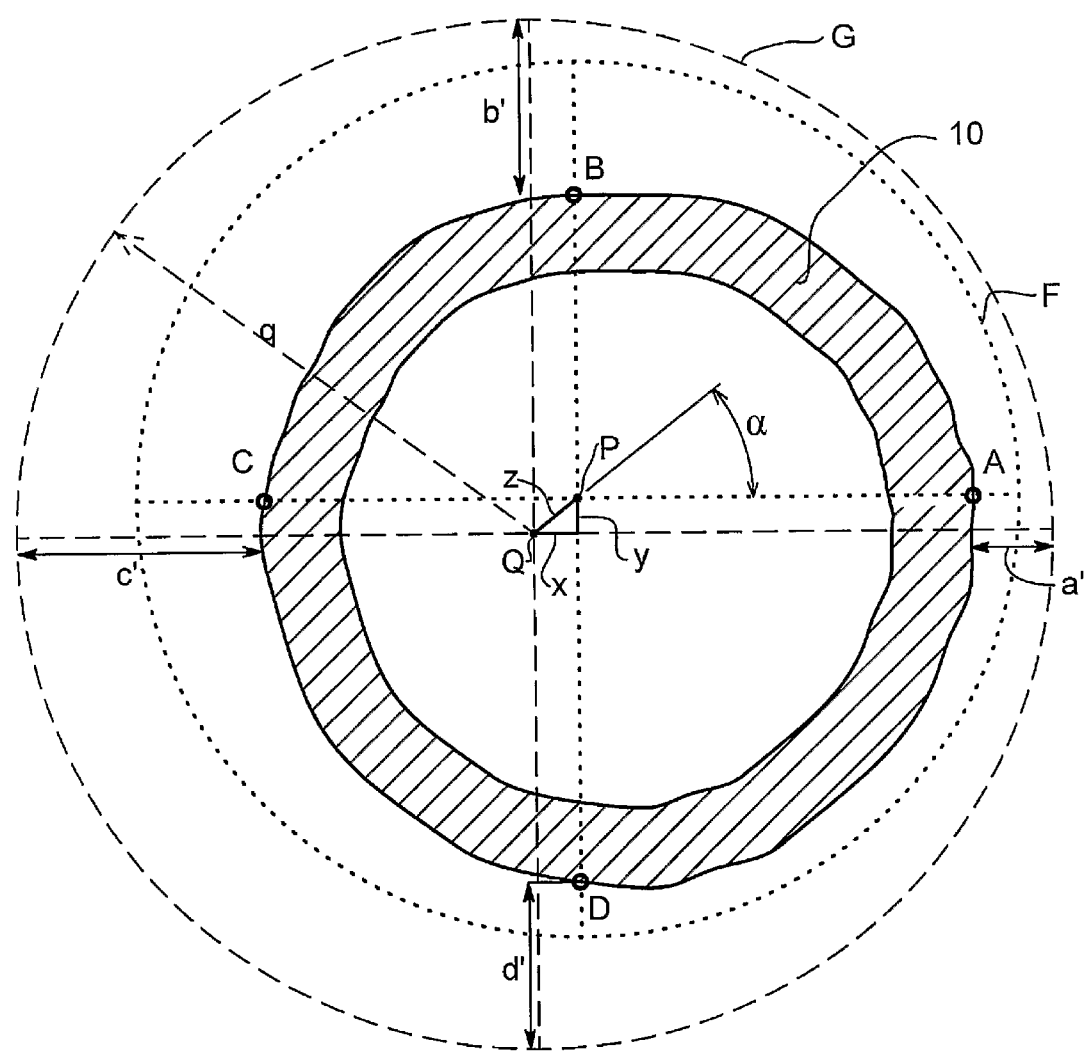

FIG. 4 shows encoder 10 now mounted about axis Q as it would be when installed and ready for use. Now, the possible separation of the axis P from the axis Q is given as distance z, which is small compared with the encoder's nominal radius. This separation has coordinates x and y and inclination α. Four further run-out dimensions can be determined (a',b',c' and d') at nominally the same points A,B,C and D with respect to another circle G centred at Q and again of arbitrary but convenient radius q.

Thus, two sets of data a,b,c, and d and a',b',c' and d' are recorded. It can be seen from FIG. 4 that the distance from production centre P to installed centre Q is z and its direction (phase) relative to point A is angle α.

Figure 5:
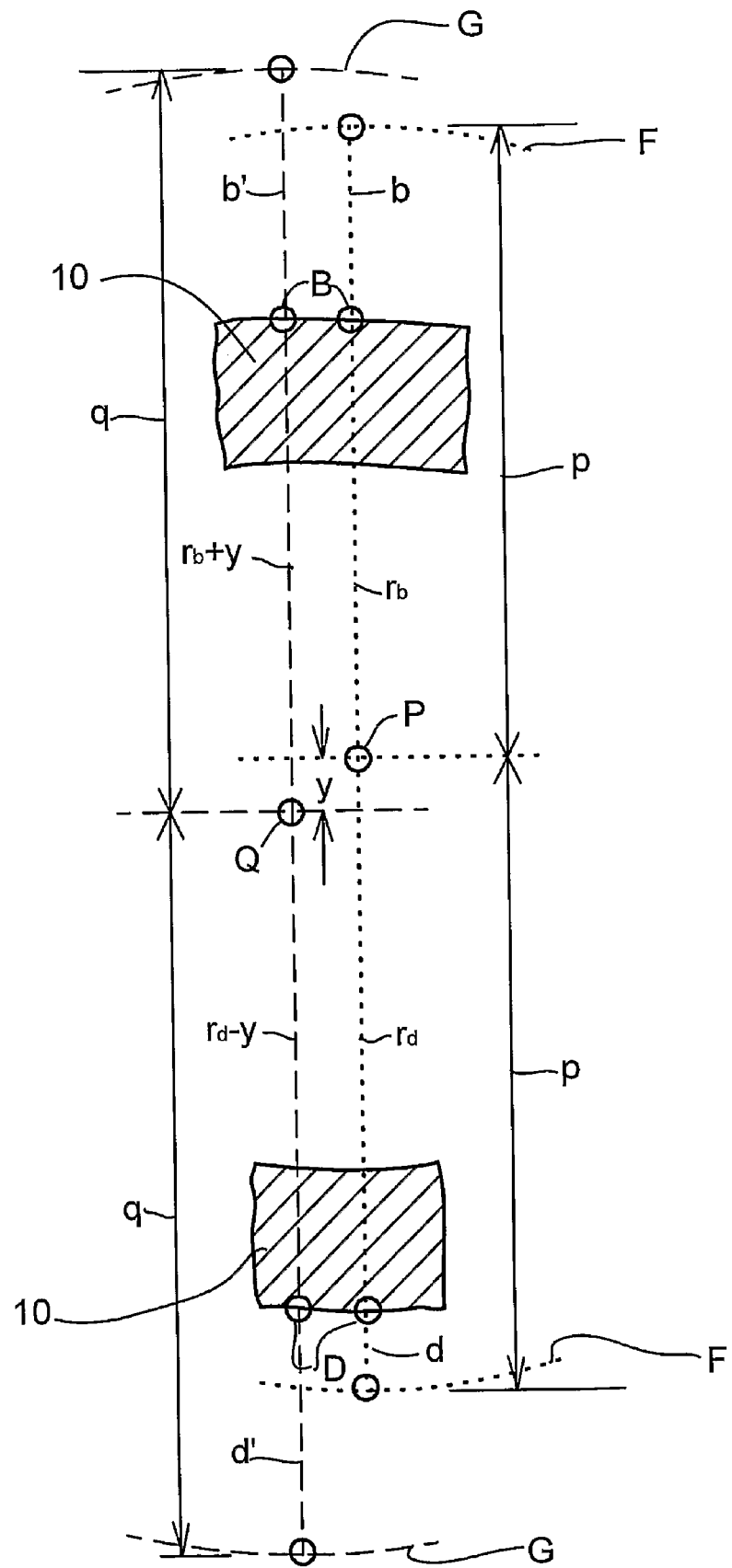

The coordinate values of x and y can be found by analysis as shown in FIG. 5. FIG. 5 shows a partial enlarged view of FIG. 4 with the relevant dimensions more clearly shown.

It follows from FIG. 5 by taking distances from Q that:

$$q = r_b + y + b' = r_d - y + d' \quad (1)$$

Rearranging equation (1) gives:

$$2y = d' - b' + r_d - r_b$$

Similarly, from P it follows that:

$$p = r_b + b = r_d + d$$

so, $r_d - r_b = b - d$ \quad (2)

From equations (1) and (2) is can be shown that:

$$2y = d' - b' + b - d \quad (3)$$

Similar analysis of the horizontal dimensions will give:

$$2x = c' - a' + a - c \quad (4)$$

Given x and y, the magnitude z and phase α of the installed centre Q with respect to the production centre P are obtainable using:

$$z^2 = x^2 + y^2 \quad (5)$$

and $\tan \alpha = y/x$ \quad (6)

It is then possible to determine the angular error of the encoder due to the eccentricity errors.

Figure 6:
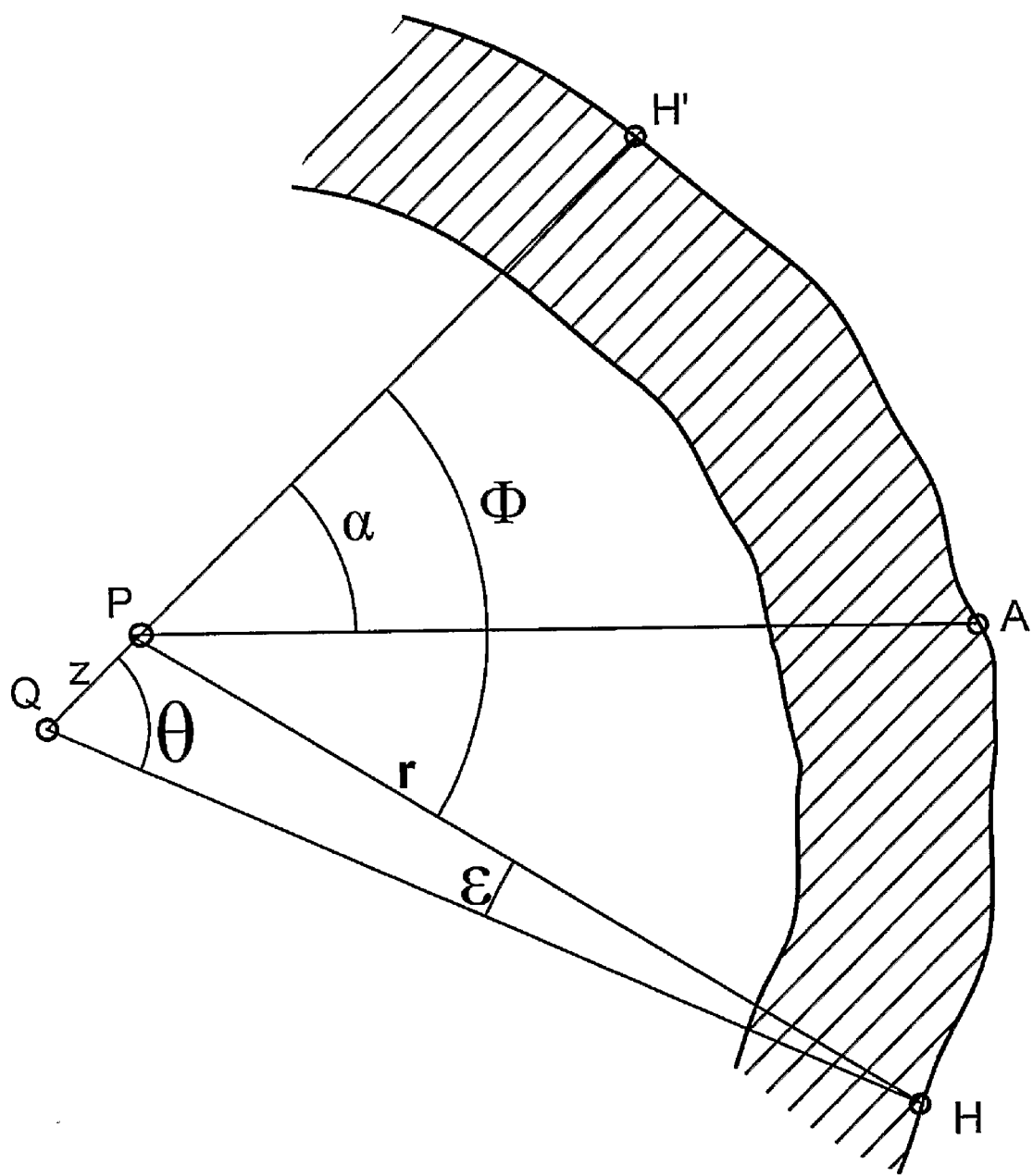

In FIG. 6, in which the encoder scale member 10 is regarded as fixed, it can be seen that if a readhead travels through a true angle θ about point Q the installed centre, from H to H' (H' being the point at which a line through both centres intersects the circumference of the encoder 10 and where no angular error will occur) then the apparent angle measured by the encoder will be Φ; the error ε=Φ−θ being the excess of apparent angle over true. This error will be small but still significant for accurate encoders. If the encoder mean radius is r then for small z/r, a good approximation, from FIG. 6 is:

$$\epsilon = z/r \sin \theta \quad (7)$$

The phase of this error is more conveniently related to a datum such as point A fixed on the encoder, with apparent readings and errors referenced from Φ=α (point A) not Φ=0 (point H'). This can be shown diagrammatically in FIGS. 7a and b. The vertical axes of the graphs define error ε and the horizontal axes defines rotation of the encoder both measured in radians. It can be seen that the error is sinusoidal.

FIG. 7a shows the relationship between ε and rotation indicating the point A where Φ=α.

FIG. 7b shows the relationship between ε and rotation using Φ=α as a datum i.e. point A on the encoder.

Thus it is possible to obtain the true angle θ by using values from the graph in FIG. 7b to subtract (positive values) or add (negative values) of ε from Φ the apparent measured angle around the encoder all with respect to a known point (A in this case).

EXAMPLE 1

An encoder is to be mounted to a shaft and its error due to eccentricity is to be determined. One known approach to determine angular error would be to compare the installed angular measurements with a master reference and to devise an error map. Such a technique requires an expensive reference and careful mounting of the reference relative to the installed centre of rotation.

According to the invention the amplitude and phase of eccentricity can be determined in the following manner:

Consider an encoder of nominal diameter 150 mm, so r=75 mm, which is manufactured in eccentricity of a=2 μm, b=7 μm, c=8 μm, d=5 μm at points A,B,C and D respectively.

If this encoder is randomly installed with no attempt to match the manufactured eccentricity, then suppose the installed eccentricity measurements at points A,B,C and D are a'=4 μm, b'=2 μm, c'=1 μm, d'=5 μm.

Using the formulae mentioned above an estimate of the encoder accuracy as installed can be made using the manufactured eccentricity and the installed eccentricity. From equations (3) and (4) above, the following can be calculated:

$$x = \tfrac{1}{2}(c' - a' + a - c) = \tfrac{1}{2}(1 - 4 + 2 - 8) = -4.5 \, \mu m$$

$$y = \tfrac{1}{2}(d' - b' + b - d) = \tfrac{1}{2}(5 - 2 + 7 - 5) = 2.5 \, \mu m$$

Also, from equation (5), $z = \sqrt{x^2 + y^2} \approx 5.15 \, \mu m$

From equation (7) angular error amplitude ε=z/r≈69 μrad or 14 arc". If this error is acceptable then the encoder can remain in place.

If less error is demanded then, without using a master reference, the following eccentricity error determination and adjustment may be used.

EXAMPLE 2

Again, the encoder scale member is taken to have a nominal radius r=75 mm (as per example 1). Manufactured eccentricity relative to an arbitrary circle at four predefined points A,B,C and D is a=2 μm, b=7 μm, c=8 μm and d=5 μm (as example 1).

At installation the above figures are known, e.g. from a calibration certificate, so the operator tries to position the encoder having similar eccentricity. This could be the same values or more probably values which are increased or decreased by an equal mount for each value e.g. all +5 μm or all −2 μm.

However, it is unlikely that the operator will achieve this aim exactly, so, the installed values might be a'=2 μm b'=8 μm c'=6 μm and d'=13 μm which is an attempt to reproduce the manufactured eccentricity.

Using equations (3) and (4) above:

$$x = \tfrac{1}{2}(c' - a' + a - c) = \tfrac{1}{2}(6 - 2 + 2 - 8) = -1 \, \mu m$$

$$y = \tfrac{1}{2}(d' - b' + b - d) = \tfrac{1}{2}(3 - 8 + 7 - 5) = -1.5 \, \mu m$$

also, using formula (5), $z = \sqrt{x^2 + y^2} \approx 1.8 \, \mu m$.

From equation (7) the amplitude of the eccentricity error is ε=z/r≈24μ rad or approximately 5 arc". Thus it can be seen that a considerable improvement in accuracy can be obtained by attempting to reproduce the as manufactured errors. The range of eccentricity is substantially no better, but accuracy is improved because errors tend to cancel out.

EXAMPLE 3

Another technique is used to predict and compensate for errors caused by eccentricity, knowing the as manufactured eccentricity errors.

Using the encoder of example 1, if no attempt is made at installation to reproduce the same eccentricity that was measured during manufacture, and any reasonable random eccentricity is accepted then as in example 1 the figures for a',b',c' and d' may be a'=4 μm, b'=2 μm, c'=1 μm and d'=5 μm.

The resultant error is now obtainable and will be the same i.e. z=5.15 μm and ε=69 μrad i.e. about 14 arc" and $\alpha=\tan^{-1} y/x = \tan^{-1} -2.5/4.5 = \tan^{-1} -0.556$.

FIG. 4 shows, with x<0 and y>0 that P is in the "top left quadrant" with respect to Q. Hence the angle between the line of centres QP, and the datum direction on the encoder to point A is α≈151°.

Figure 8A:
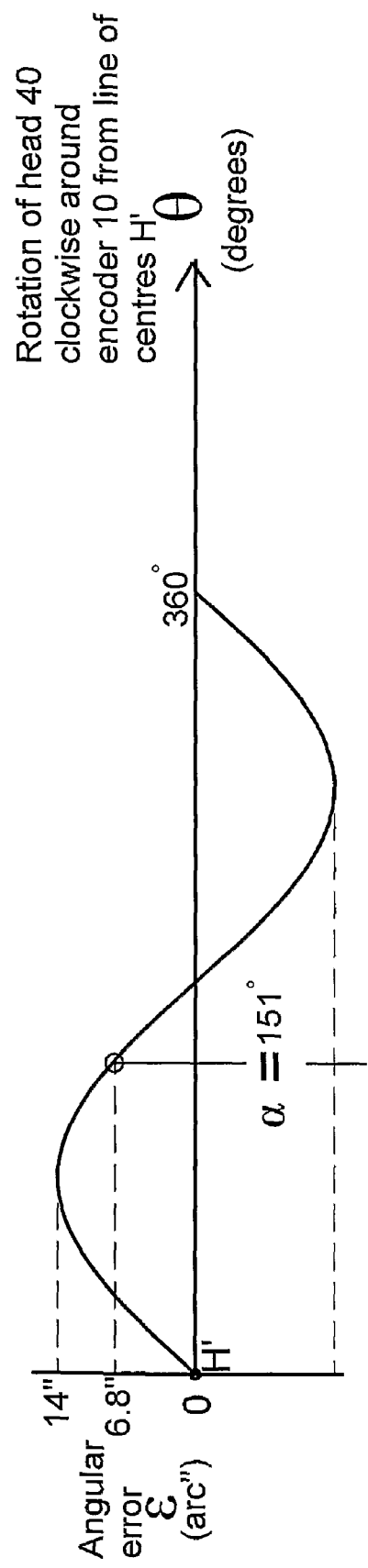
Figure 8B:
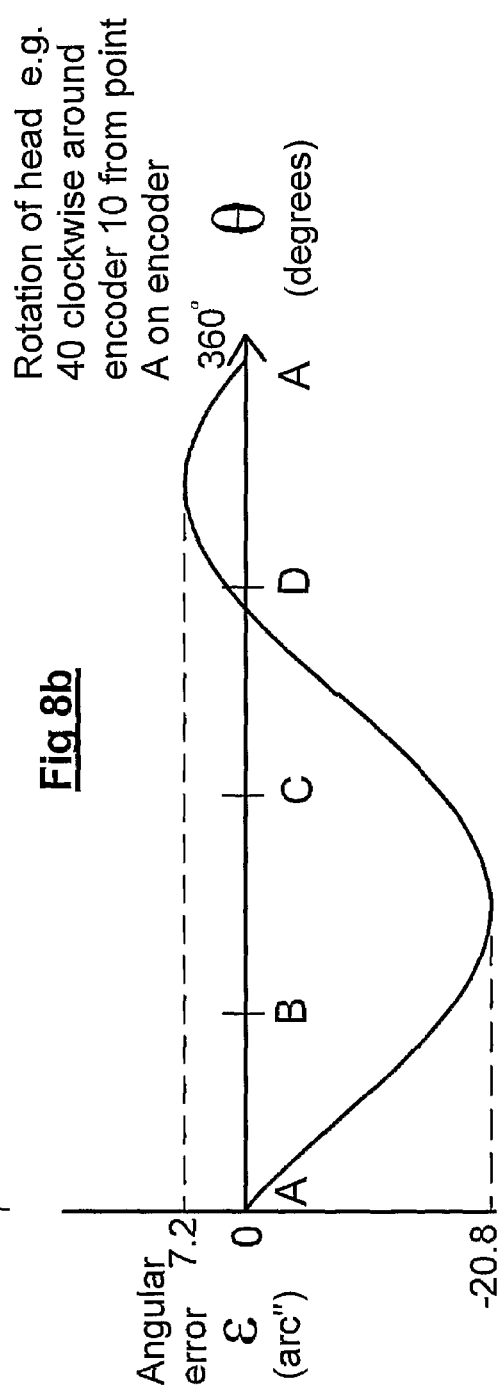

The error ε is shown in FIG. 8a. The correction to be applied at any angle relative to datum A is shown in FIG. 8b. Consequently the encoder error as installed, including eccentricity errors for manufacturing, expressed as the excess of indicated angle Φ over true angle θ of head rotation clockwise from line of centres at H' on the fixed encoder is ε≈14 arc" sin θ.

This predicted error can then be used to create an error map or similar means of correction to the apparent angle, without any need to calibrate against a master angular reference. Such an error map is shown in FIG. 8a with respect to line of centres H' and FIG. 8b, more conveniently from point A on the encoder.

In practice if the eccentricity is measured either manually or by revolving the encoder and measuring the eccentricity automatically then an error ε and phase α can be obtained using an algorithm. Such an error signal can be used to correct the apparent angular signal obtained from the reader 40. This can be achieved by signal processing means 60. The signal processor can automatically add or subtract an angular value in a manner similar to the correction obtainable from the graphs of FIGS. 7 and 8, dependent on the position of the encoder relative to a datum.

Alternatives to the embodiments described, within the ambit of the invention, will be apparent to the skilled addressee. The encoder shown need not have its markings aligned in an axial manner. The markings could be radial, with some surface or markings available from which eccentricity can be determined. The encoder could be arcuate rather than completely circular.

Angular incremental marks on an encoder are illustrated, but absolute encoders might be used also with equal effect, whereby absolute angular measurement would be corrected. The encoder shown is of an optical type however other encoders can be used e.g. magnetic, capacitive etc.

If less accuracy is required and manufacturing tolerances are very good, the calibration data obtained when the eccentricity is measured following manufacture of the encoder can be assumed to be zero. In such an instance the amplitude and relative angle of the sinusoidal error can be obtained directly from the DTI during installation of the encoder 10 and a perfect production (i.e. a,b,c and d=0) is assumed. However, this technique will provide less accuracy if the marks on the encoder are not accurately divided about the geometric centre of the encoder during manufacture.

A DTI need not be used for measurement of the eccentricity of the encoder. Other displacement measurement devices could be used.

For a good understanding the errors shown in the drawings have been exaggerated. In practice typically a few microns (μm) of eccentricity would be measured. The process according to the invention allows rapid and possibly automatic correction for eccentricity errors without the need for plural readheads or a master reference. If an encoder's position is disturbed in use it is a straightforward task to recalibrate its error.

Adjustment of the encoder about a nominal centre could be other than the taper mount discussed e.g. radial adjustment screws could be employed. The eccentricity error can be mapped, and possibly together with errors from other sources, recorded in an error map rather than continual calculation.

The invention claimed is:

1. A method of producing a rotary encoder comprising the steps of:
    (i) taking an encoder scale blank having a geometric centre;
    (ii) mounting the encoder scale blank centered about a second centre;
    (iii) producing a scale on the encoder scale blank thereby forming an encoder scale member of the rotary encoder, the scale of the encoder scale member being centered about the second centre; and
    the step of (iv) measuring an eccentricity between the geometric centre and the second centre.

2. The method according to claim 1 wherein step (iv) comprises measuring any change in apparent radius of an element of the encoder scale member when said encoder scale member is rotated to a plurality of different angular orientations.

3. The method according to claim 2 wherein said plurality of different angular orientations comprises three or more different angular orientations.

4. The method according to claim 2 wherein the encoder scale member comprises at least one marking to identify said plurality of orientations.

5. The method according to claim 1 further comprising a step of (v) installing the encoder scale member in a working location centered about a third centre.

6. The method according to claim 5 further comprising a step of (vi) measuring the eccentricity between the geometric centre and the third centre.

7. The method according to claim 6 wherein step (vi) comprises measuring a change in apparent radius of an element of the encoder scale member at a plurality of angular orientations.

8. The method according to claim 7 wherein step (vi) comprises measuring the change in apparent radius of an element of the encoder scale member at three or more angular orientations.

9. The method according to claim 8 wherein step (iv) comprises measuring any change in apparent radius of the element of the encoder scale member when said encoder scale member is rotated to the plurality of different angular orientations and measuring the change in apparent radius at the same angular orientations that are measured in step (vi).

10. The method according to claim 7 further comprising a step of (viii) calculating an amplitude and phase of a sinusoidal eccentricity error caused by the difference in position of the second and third centres.

11. The method according to claim 10 further comprising a step of (ix) generating an angular output signal that is corrected for eccentricity.

12. The method according to claim 6 further comprising a step of (vii) adjusting the working location of the encoder scale member.

13. The method according to claim 12 wherein step (vii) comprises adjusting the working location of the encoder scale member and repeating step (vi) until the eccentricity between the geometric centre and the second centre as measured in step (vi) substantially matches the eccentricity between the geometric centre and the third centre as measured in step (iv).

14. The method according to claim 1 wherein step (iii) comprises using a laser to form scale markings on the encoder scale blank.

15. The method according to claim 1 wherein the encoder scale member comprises at least one of a ring and an arcuate member.

16. A method of mounting an encoder scale member, the method comprising the steps of:
(a) taking an encoder scale member formed using the method according to claim 1, wherein the eccentricity between the geometric centre and the second centre is known;
(b) mounting the encoder scale member in a working location centered about a third centre; and
(c) measuring the eccentricity between the geometric centre and the third centre.

* * * * *